(12) United States Patent
Nygren et al.

(10) Patent No.: US 6,801,618 B2
(45) Date of Patent: Oct. 5, 2004

(54) SYSTEM AND METHOD FOR IMPLEMENTING RECORDING PLANS USING A SESSION MANAGER

(75) Inventors: Blair E. Nygren, Coppell, TX (US); William O. Whisenhunt, Coppell, TX (US); Abhay S. Shah, Irving, TX (US)

(73) Assignee: eTalk Corporation, Irving, TX (US)

( * ) Notice: Subject to any disclaimer, the term of this patent is extended or adjusted under 35 U.S.C. 154(b) by 351 days.

(21) Appl. No.: 10/071,555

(22) Filed: Feb. 8, 2002

(65) Prior Publication Data

US 2003/0154240 A1 Aug. 14, 2003

(51) Int. Cl.[7] .......................... H04M 3/22; H04M 3/523
(52) U.S. Cl. ............................ 379/265.06; 379/32.01; 379/32.04; 379/265.07
(58) Field of Search ........................... 379/32.01, 32.02, 379/32.04, 265.01, 265.02, 265.06, 265.07, 265.08

(56) References Cited

U.S. PATENT DOCUMENTS

| | | | |
|---|---|---|---|
| 5,793,861 A | 8/1998 | Haigh | 379/266.01 X |
| 5,946,375 A | 8/1999 | Pattison et al. | 379/112.01 |
| 6,058,163 A | 5/2000 | Pattison et al. | 379/265.06 |
| 6,263,049 B1 | 7/2001 | Kuhn | 379/32.01 |
| 6,542,602 B1 * | 4/2003 | Elazar | 379/265.06 |
| 2001/0012356 A1 | 8/2001 | McDuff et al. | 379/265.02 |

FOREIGN PATENT DOCUMENTS

| | | | |
|---|---|---|---|
| EP | 1 016 998 A2 | 7/2000 | G06F/17/60 |
| WO | WO 01/54388 A1 | 7/2001 | H04M/1/64 |
| WO | WO 01/60027 A2 | 8/2001 | H04M/3/00 |
| WO | WO 01/75747 A1 | 10/2001 | G06F/17/60 |

OTHER PUBLICATIONS

Ronni T. Marshak, "IBM's FlowMark Object–Oriented Workflow for Mission–Critical Applications," *Workgroup Computer Report*, vol. 17, No. 5, XP000568699, May 1994, 11 pages.

David Hollingsworth, "The Workflow Reference Model," Document No. TC00–1003, *Workflow Management Coalition*, Jan. 19, 1995, 55 pages.

Kerry W. Hassler et al., "Revolutionizing Definity® Call Centers in the 1990s, " *AT&T Technical Journal*, Jul./Aug. 1995, 10 pages.

PCT International Search Report in International Application No. PCT/US 03/01759, dated Nov. 14, 2003, 7 pages.

International Search Report in International Application No. PCT/US 03/01684, dated Jun. 2, 2003, 8 pages.

International Search Report in International Application No. PCT/US 03/01685, dated Jun. 4, 2003, 8 pages.

* cited by examiner

Primary Examiner—Harry S. Hong
(74) Attorney, Agent, or Firm—Baker Botts L.L.P.

(57) ABSTRACT

A system for implementing a recording plan comprises a first record manager, a second record manager, and a session manager. The first record manager generates a first message that comprises a request to record a first session according to a recording plan, wherein the first session is conducted by a client associated with the recording plan. The session manager is communicatively coupled to the first record manager and the second record manager. The session manager generates a second message for communication to the first record manager. The second message comprises an authorization to record the first session. The session manager further generates a third message for communication to the second record manager. The third message comprises a command to record a second session.

24 Claims, 4 Drawing Sheets

FIG. 2

General

Name: xyz  *112*
Description: *124*
☐ Plan is Activated  *122*  *114*
*126*

Details

Beginning [1/7/2002 ▼] *130* *132*, this plan is to begin monitoring *134* [any user defined in the system [Global] ▼] using the [greatest dispersion ▼] method for recording. The plan should attempt to obtain [10] [Voice ▼] recordings during a
*140* *140*  *144*  *136* *138*
[1] [week ▼] period, with a maximum of [5] recordings per day. Recordings can only be obtained between [12:00 AM] and [11:59 PM] each day, and they are
*150*  *152*  *146*  *148*
[allowed ▼] to have a [voice ▼] trigger occur to start the recording. Required triggers are defined in the triggers section of this plan.

The [(Not Selected) ▼] *154* voice template and/or *156* [(Not Selected) ▼] screen template should be used to determine the attributes for recording.

The plan should repeat [1] *158* times before ending. Based on these settings, the plan should complete its work on 1/14/2002.

Triggers

Triggers  *162* Name  *116*
📞 ANI
📞 DNIS   *160*   Value
📄 UUData
[Add] [Edit] [Delete]

Users

Owner
[Bill Jones ▼] *164*  *168*  *118*
Available Groups and Users    Assigned Users

| Name | Voice Alias Type | Voice Alias |
|------|------------------|-------------|
| John Smith | ... | ... |
| Kathy Baker | ... | ... |

John Smith
Michael Richards   *166*
Kathy Baker

Notifications

Notifications
Ken Hicks   *170*   Email Address   *172*   *120*
KHICKS@xxxxx.xxx   [Add] [Edit] [Delete]

*110*

SESSION TABLE 100

| SESSION ID (202) | RECORDING TYPE (204) | RECORDING PLAN ID (206) | PRIORITY (208) | RESOURCES IDENTIFIER (210) | CLIENT ID (212) |
|---|---|---|---|---|---|
| 1 | VIDEO | 246 | 5/10 | DATA NETWORK 20 | 10.200.2.3 |
| 2 | VOICE | 246 | 5/10 | VOICE CHANNEL 1 | X6581 |
| 3 | VOICE | ROD | 10/10 | VOICE CHANNEL 15 | X6645 |
| 4 | VOICE | 123 | 1/10 | VOICE CHANNEL 20 | JOHN SMITH |
| ⋮ | ⋮ | ⋮ | ⋮ | ⋮ | ⋮ |

*FIG. 3*

TRANSACTION TABLE 200

| CLIENT ID (230) | RECORDING PLAN ID (232) | RECORDING SPECIFICATIONS (234) | PATH ID (236) | TRIGGER INFORMATION (238) |
|---|---|---|---|---|
| 10.200.2.3 | 246 | LENGTH: 00:04:32; START: 7:50.00; END: 7:54.32; ON-HOLD: 2:32.01 | video5@server | WEBSITE LAUNCHED |
| X6581 | 246 | LENGTH: 00:04:32; START: 7:50.00; END: 7:54.32 | f:\voice\5011982.dat | ON-HOLD CONDITION |
| X6645 | ROD | LENGTH: 00:24:12; START: 14:05.00; END: 14:29.12; CTI EVENTS | http:\\voiceann5.cti | ANI/DNIS INFORMATION |
| JOHN SMITH | 123 | LENGTH: 00:10:21; START: 17:51.00; END: 18:01.21 | c:\video\3.dat | NONE |
| ⋮ | ⋮ | ⋮ | ⋮ | ⋮ |

*FIG. 4*

SYSTEM AND METHOD FOR IMPLEMENTING RECORDING PLANS USING A SESSION MANAGER

CROSS-REFERENCE TO RELATED APPLICATIONS

This application is related to and filed concurrently with pending U.S. patent application Ser. No. 10/072,408, entitled "System and Method for Implementing Recording Plans Using a Presence-Based Plan Manager" and pending U.S. patent application Ser. No. 10/072,431, entitled "System and Method for Processing Work According to an Active Work Model". These applications have been commonly assigned to e-talk Corporation.

TECHNICAL FIELD OF THE INVENTION

This invention relates generally to communication systems, and more particularly to a system for implementing recording plans using a session manager.

BACKGROUND OF THE INVENTION

Call centers provide a wide array of services through sessions that may include both a voice session and a data session. In a call center environment, it is important to record, store, and communicate voice and data sessions efficiently. Prior call center systems provided rigid schedules against which voice and/or data sessions were recorded for a particular service representative. A drawback to this approach is that the work schedule of a particular service representative may not be consistent with the recording schedule that is established. This may cause the call center to dedicate hardware and/or software resources unnecessarily.

SUMMARY OF THE INVENTION

In accordance with the present invention, a system and method for implementing a recording plan using a session manager are provided that substantially eliminate or reduce disadvantages or problems associated with previously developed communication systems and methods.

According to one embodiment, a system for implementing a recording plan based upon the presence of a client includes a client monitor and a plan manager. The client monitor generates a presence message signifying the presence of a client on a network associated with the system. The presence message comprises a presence type and a client identity. The plan manager receives the presence message from the client monitor and, in response, retrieves a plan template based upon the client identity and the presence type. The plan manager creates a recording plan associated with the client based at least in part upon the plan template.

According to another embodiment, a system for implementing a recording plan comprises a first record manager, a second record manager, and a session manager. The first record manager generates a first message that comprises a request to record a first session according to a recording plan, wherein the first session is conducted by a client associated with the recording plan. The session manager is communicatively coupled to the first record manager and the second record manager. The session manager generates a second message for communication to the first record manager. The second message comprises an authorization to record the first session. The session manager further generates a third message for communication to the second record manager. The third message comprises a command to record a second session.

Depending on the specific features implemented, particular embodiments of the present invention may exhibit some, none, or all of the following technical advantages. One aspect of the present invention provides a platform that implements recording plans based upon the detected presence of clients on a network of the system. The recording plans are activated and executed to record various voice and/or data sessions conducted by the client such as, for example, in a call center environment. The presence of the client may be detected on a voice network or data network of the system. A particular advantage of this presence-based implementation of recording plans is that the hardware and/or software resources of the system are more efficiently allocated. Moreover, the monitoring and recording of voice and/or data sessions need not be performed according to rigid schedules that fail to accommodate for client unavailability.

Other technical advantages are readily apparent from one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which:

FIG. 2 illustrates a graphical user interface for generating plan templates used by the system;

FIG. 3 illustrates one embodiment of a session table maintained in the system;

FIG. 4 illustrates one embodiment of a transaction table maintained in the system.

DETAILED DESCRIPTION OF THE INVENTION

Figure 1:
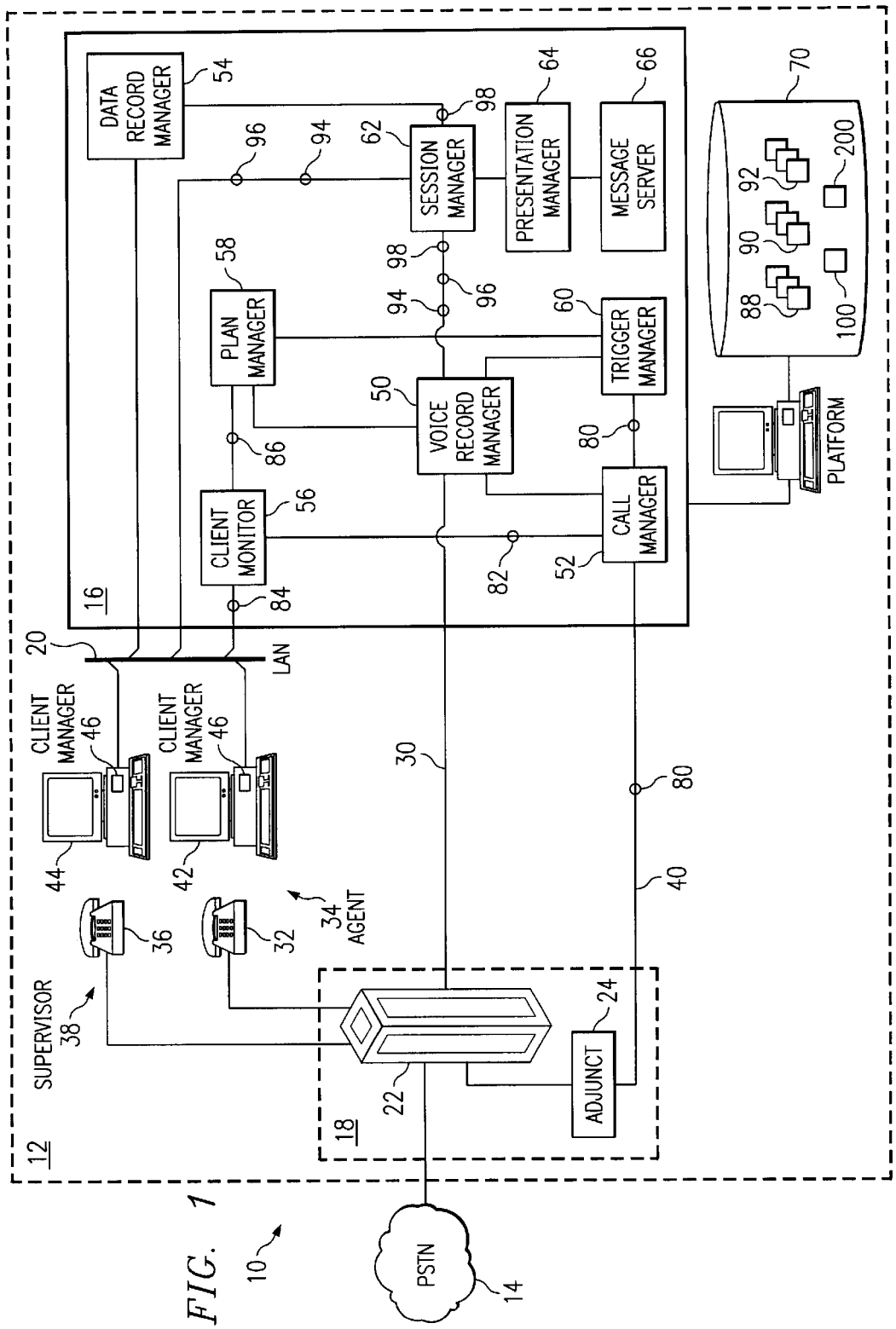
FIG. 1 illustrates a communication system for implementing recording plans in accordance with the present invention.

FIG. 1 illustrates a communication system 10 that includes a call center 12 coupled to the public switched telephone network (PSTN) or other switched or other dedicated communication facility that can establish sessions with call center 12, which is referred to generally as PSTN 14. In general, call center 12 provides a wide array of services through sessions that may include both a voice session and a data session. The components of call center 12 provide various functions and features that allow recording and faithful reproduction of the sessions. In one embodiment, these features and functions are performed according to the presence-based activation and subsequent execution of recording plans 90.

Call center 12 comprises a platform 16 coupled to a voice network 18 and a data network 20. Voice network 18 comprises an automatic call distributor (ACD), a private branch exchange (PBX), or other telecommunications switch 22. Switch 22 is coupled to a voice record manager 50 of platform 16 using lines 30. Lines 30 support a variety of voice channels that allow platform 16 to monitor and record voice sessions conducted on voice network 18. A voice session comprises any suitable communication using voice network 18. For example, a call center service representative may engage in voice communication with a customer to produce a voice session. Platform 16 also receives information over lines 30 regarding the operation of switch 22 and the handling of calls received in call center 12. This information may include call set-up information, traffic statistics, data on individual calls and call types, automatic number identification (ANI) information, computer telephony integration (CTI) information, or other information that may be used by platform 16 to implement recording plans 90. Switch 22 is also coupled to a voice instrument 32 at agent workstation 34 and a voice instrument 36 at supervisor workstation 38. Voice instruments 32 and 36 terminate voice paths established from voice record manager 50 via switch 22.

Network 18 further comprises an adjunct 24 that is coupled to call manager 52 of platform 16 using link 40. Adjunct 24 comprises a computer telephony integration (CTI) application or platform, contact control server, or other adjunct device accessible by platform 16 to perform call center functions. Adjunct 24 may also include a link to other components of the call center's management information system (MIS) host for obtaining agent and supervisor names, identification numbers, expected agent schedules, customer information, or any other information relating to the operation of the call center. Adjunct 24 may be implemented in an onsite or remote mainframe, workstation, personal computer, or other device that includes sufficient processing and storage capacity.

Data network 20 may comprise a local area network, wide area network, or other communication network that supports communication of data between a data record manager 54 of platform 16 and computers 42 and 44 associated with agent workstation 34 and supervisor workstation 38, respectively. Computers 42 and 44 may be referred to generally as computers 42, and may include a real time clock, a processor, volatile and non-volatile memory (RAM, ROM, CD-ROM, optical disk, etc.), a display, a mouse, a keyboard, and other suitable input/output devices. Although FIG. 1 illustrates one agent workstation 42 and one supervisor workstation 44, it is understood that call center 12 may include numerous agent workstations 42 and supervisor workstations 44. Workstations 34 and 38 and/or computers 42 and 44 may be referred to generally as clients. A client manager 46 comprises a software module and associated interfaces that operates on computer 42 to interact with platform 16 and to provide various features and functions that allow recording and faithful reproduction of data sessions.

A data session comprises information that is generated, retrieved or manipulated on a computer 42 of a client. For example, a data session may comprise keyboard entries, screen display and/or draw commands, video processes, web/HTTP activity, e-mail activity, fax activity, applications, data network 20 processes, or any other suitable information or process associated with a computer 42 of a client. In a call center environment, clients are typically operated by service representatives or their supervisors.

In addition to voice record manager 50, call manager 52, and data record manager 54, platform 16 further comprises a client monitor 56 coupled to data network 20. A plan manager 58 is coupled to client monitor 56 and a trigger manager 60. A session manager 62 is coupled to data network 20, voice record manager 50, data record manager 54, and a presentation manager 64. A message server 66 is coupled to presentation manager 64.

Platform 16 maintains a database 70 that stores various templates, files, tables, voice segments, data segments, and any other suitable information or data used to faithfully record and reproduce voice and data sessions. Database 70 may be implemented in one or more separate databases accessed locally or remotely by the components of platform 16.

The various components of platform 16 illustrated in FIG. 1 provide a conceptual block diagram of an exemplary hardware and software configuration. It is understood, however, that the components of platform 16 may be implemented in any suitable arrangement as one or more modules, routines, and application interfaces that operate on one or more processors. Furthermore, call center 12 may include one or more switches 22 and platforms 16 depending on the particular design capacity and implementation details of communication system 10.

System 10 generally performs two basic operations including the presence-based activation of recording plans 90 and the subsequent execution or fulfillment of recording plans 90. The following description of each operation is primarily detailed with respect to one recording plan 90 associated with a particular client, but it is understood that system 10 is capable of operating with respect to any appropriate number and combination of recording plans 90 for any appropriate number and combination of clients simultaneously.

System 10 activates recording plans 90 based upon the detected presence of clients within voice network 18 or data network 20 of call center 12. Call manager 52 is generally responsible for detecting the presence of a client within voice network 18. Client manager 46 is generally responsible for detecting the presence of a client within data network 20.

The following discussion illustrates an example of detecting client presence within voice network 18. Switch 22 initiates a voice session at call center 12 in response to receiving a call from PSTN 14. Switch 22 transfers the call to voice instrument 32 of the appropriate client. Adjunct 24 generates an event message 80 that is communicated to call manager 52 and/or trigger manager 60 of platform 16. Event message 80 may comprise information identifying the extension of voice instrument 32, profile information, call details (e.g., call start, call end, call transfer, on-hold, off-hold, ringing), login/logout information, Automatic Number Identification (ANI) information, Dialed Number Identification Service (DNIS) information, or any other information that indicates the presence and identity of a client on voice network 18. In one embodiment, message 80 is formatted as a CTI message. In response to receiving event message 80, call manager 52 communicates a login notification message 82 to client monitor 56. Login notification message 82 may comprise all or a portion of the information communicated in event message 80. Message 82 indicates that an appropriate recording plan 90 may be activated for the particular client whose presence was detected on voice network 18.

The following discussion illustrates an example of detecting client presence on data network 20. Client manager 46 detects a login event of an associated client to data network 20. The login event may comprise any technique by which the client makes data network 20 recognize the client such that, for example, the client may begin a computer session. This may include the entry of a username and password and subsequent verification and authorization of the client. In response, client manager 46 generates a login notification message 84 that is communicated to client monitor 56 of platform 16. Message 84 comprises profile information, IP address of computer 42 associated with the client, and any other information used to indicate the presence and identity of a client on data network 20. Message 84 indicates that an appropriate recording plan 90 may be activated for the particular client whose presence was detected on data network 20.

Client monitor 56 receives login notification message 82 from call manager 52 and/or message 84 from client manager 46 based upon the type of presence that is detected as described above. Client monitor 56 generates a presence message 86 for communication to plan manager 58 in response to receiving message 82 and/or 84. Presence message 86 comprises information identifying the type of presence detected in call center 12. For example, if the client connects to voice network 18 such that client monitor 56 receives a login notification message 82 from call manager 52, then presence message 86 may indicate the voice presence of the client. If a client connects to data network 20 of call center 12 such that client manager 46 communicates a login notification message 84 to client monitor 56, then presence message 86 may indicate the data presence of the client. If the client connects to both voice network 18 and data network 20, then presence message 86 may indicate both the voice presence and the data presence of the client. In addition to the type of presence detected within call center 12, presence message 86 further indicates the identity of the client whose presence was detected.

Plan manager 58 receives presence message 86 indicating the client's presence and identity within call center 12. In response, plan manager 58 activates an appropriate recording plan 90 for the client. An advantage of system 10 is that by activating a recording plan 90 for a client based upon the detected presence of the client within a voice network 18 or data network 20 of call center 12, the hardware, software, and memory resources of call center 12 may be used efficiently.

To activate a recording plan 90 for a client, plan manager 58 queries database 70 for an appropriate plan template 88. Plan templates 88 stored in database 70 comprise recording parameters and guidelines, trigger information, and participant information that may be used to create a recording plan 90 for a particular client. Plan templates 88 may be created by a user of system 10 using the graphical user interface described in greater detail with reference to FIG. 2. Plan manager 58 retrieves an appropriate plan template 88 from database 70 based upon the type of presence that is detected (e.g., voice presence, data presence, voice and data presence) and the identity of the particular client whose presence was detected. For example, if plan manager 58 receives a presence message 86 indicating that client X logged into voice network 18, plan manager 58 retrieves an appropriate plan template 88 that can be used to create a voice recording plan 90 for client X. If presence manager 86 indicates that client X logged into data network 20, plan manager 58 retrieves an appropriate plan template 88 that can be used to create a data recording plan 90. If presence message 86 indicates both voice and data presence of client X, then plan manager 58 retrieves an appropriate plan template 88 that can be used to create a voice recording plan 90 and a data recording plan 90.

Once an appropriate plan template 88 is retrieved, in a particular embodiment, plan manager 58 retrieves client information 92 based upon the client identity indicated in presence message 86. Client information 92 may comprise information maintained by a workforce management system associated with call center 12 such as, for example, expected client schedules and client availability information.

Plan manager 58 creates a recording plan 90 for the particular client based at least in part upon the retrieved plan template 88. In a particular embodiment, plan manager 58 creates a recording plan 90 further based upon client information 92. The recording plan 90 may be a voice recording plan 90, a data recording plan 90, or a voice and data recording plan 90, and generally comprises instructions and guidelines for recording voice and/or data sessions conducted by the client and is generally based on various scheduling criteria for a particular plan period. In one embodiment, the recording instructions may identify a number of voice and/or data sessions to be recorded during a plan period according to a recording pattern associated with the scheduling criteria. The recording instructions may comprise constraints on recordings. The recording instructions may comprise instructions to record voice and/or data sessions during a plan period in response to the occurrence of various trigger conditions. For a voice recording plan, for example, various trigger conditions may be based upon the occurrence of CTI events within voice network 18. For a data recording plan, for example, the various trigger conditions may be based upon client activity at an associated computer 42 (e.g., keyboard entries, screen display and/or draw commands, mouse movement, application launch). The recording instructions of a recording plan 90 are generally not tied to a strict schedule but, rather, are flexible enough to be implemented over the course of a plan period according to the availability of clients and network resources upon detecting the presence of the client.

Recording plans 90 may comprise client recording plans 90 and/or master recording plans 90. Client recording plans 90 are created for a particular client of call center 12, as described above. Master recording plans 90 may be applied to groups of clients in call center 12. Master recording plans 90 generally comprise global trigger conditions used to initiate recordings of voice and/or data sessions.

In particular instances, recording plans 90 may be activated at one time and then deactivated at a later time without being completely fulfilled. For example, a client may log-off from voice network 18, data network 20, or both. In another example, error or reset conditions may occur. In these instances where a recording plan 90 has been deactivated, the recording plan 90 may be reactivated upon the detected presence of the associated client. The recording instructions of reactivated recording plans 90 generally account for the fact that a portion of the recording plan 90 may already be completed. For example, if a particular recording plan 90 is ninety percent completed when reactivated, then the associated recording instructions may be adjusted based at least in part upon the portion of the recording plan 90 already completed, the remaining period of time in the plan period, the maximum number of recordings that may be performed in a given day, the recording pattern that is selected, and a host of other scheduling criteria. In this regard, the recording plan 90 comprises a dynamic plan that adjusts based upon client availability, resource availability, and the then current progress in fulfilling the recording plan 90.

In one embodiment, as a part of activating recording plans 90, plan manager 58 determines and assigns a priority for each recording plan 90 based upon a number of factors, such as, for example, the percentage of the recording plan 90 remaining to be fulfilled, the available hardware and/or software resources, statistical trending information associated with call center 12, client availability, and any other suitable information. Recording plans 90 that are reactivated may be assigned a modified priority based upon the then current status of the above criteria.

The activation and execution of multiple recording plans 90 may overlap within call center 12. Because there may not be enough processing capacity and network resources to execute every recording plan 90 that is activated during a given period of time, the priorities that are assigned to individual recording plans 90 are useful for allocating valuable resources in call center 12. For example, a recording plan 90 with a higher priority established by plan manager 58 may be executed ahead of a recording plan 90 with a lower priority. As described in greater detail below with regard to session manager 62, the execution of multiple recording plans 90 may be prioritized based upon the priority of any given recording plan 90.

Upon creating a recording plan 90 for a particular client whose presence is detected in call center 12, plan manager 58 communicates recording plan 90 to client manager 46, voice record manager 50 and/or trigger manager 60 based upon the type of recording plan 90. For example, data recording plans 90 may be communicated to client manager 46 for recording data sessions. Voice recording plans may be communicated to call manager 52 to record voice sessions. Voice recording plans 90 that include trigger conditions may be communicated to trigger manager 60. Master recording plans 90 may be communicated to client manager 46, voice record manager 50, and/or trigger manager 60.

Once a recording plan 90 is activated for a particular client based upon detecting the presence of the client, call center 12 records voice and/or data sessions conducted by the client according to the recording plan 90. The following discussion illustrates an example of recording a voice session and/or a data session according to a recording plan 90. Voice record manager 50 may determine that a particular voice session conducted by the client may be recorded to fulfill an associated voice recording plan 90 in accordance with the recording instructions or as a result of the occurrence of a trigger condition as determined and communicated by trigger manager 60. Trigger manager 60 may determine that a trigger condition has occurred in response to receiving an event message 80 from voice network 18. In response, voice record manager 50 communicates a message 94 to session manager 62 requesting authorization to record the voice session according to the appropriate voice recording plan 90. Similarly, client manager 46 may determine that a particular data session conducted by the client may be recorded to fulfill an associated data recording plan 90 in accordance with the recording instructions or as a result of the occurrence of a trigger condition. In response, client manager 46 communicates a message 94 to session manager 62.

Message 94, whether communicated by voice record manager 50 or client manager 46, generally comprises information identifying the client (e.g., username, password, extension, IP address), at least a portion of the information from the recording plan 90, and an indication of any resources necessary to record the voice and/or data session. In a particular embodiment, voice record manager 50 and/or client manager 46 may begin recording the voice and/or data session prior to receiving authorization from session manager 62 in response to message 94 so as to preserve the integrity of the session.

Session manager 62 controls the execution of various recording plans 90 in a number of ways. For example, session manager 62 determines whether any particular request to record a voice and/or data session will be authorized. Second, session manager coordinates the operation of various components within call center 12 to synchronize, where appropriate, the recording of voice and data sessions for a particular client. Third, session manager 62 maintains a session table 100 that tracks multiple ongoing sessions that are being recorded in call center 12. Fourth, session manager 62 usurps network resources allocated to one or more ongoing sessions in favor of other sessions based upon the priority of associated recording plans 90 and/or based upon "record on demand" commands received by session manager 62.

To authorize or reject a request to record a session communicated in a message 94, session manager 62 may determine whether there is available capacity to record the requested voice and/or data session. In general, session manager 62 maintains updated information regarding the available capacity within system 10 to record voice and/or voice sessions. For example, session manager 62 may maintain information that identifies the number of available voice channels, traffic patterns, switch 22 capacity, and other statistics associated with voice network 18. In another example, session manager 62 may maintain information that identifies the available bandwidth, data traffic, server capacity, or other statistics associated with data network 20.

In one embodiment, session manager 62 determines the available capacity based upon the type of recording that is requested by a corresponding message 94. For example, session manager 62 may determine whether available capacity exists within voice network 18 to record a voice session. In one embodiment, particular groups of lines 30 are allocated to corresponding groups of clients in a call center 12. For example, clients residing within the billing department of a particular entity may be allocated a first group of voice channels while clients residing in a customer service department of the entity may be allocated a second group of voice channels. Based on the particular group within which the client resides, session manager 62 may determine the available capacity of voice channels to record a voice session conducted by the client. For another example, session manager 62 determines whether available capacity exists within data network 20 and with data record manager 54 to record a data session conducted by the client.

In the event that there is insufficient capacity within voice network 18, session manager 62 generates a response message 96 for communication to voice record manager 50 denying authorization to record an additional voice session. For example, response message 96 may instruct voice record manager 50 that the voice session identified in message 94 should not be recorded. In the event that session manager 62 determines that there is not sufficient capacity within data network 20 or with data record manager 54, session manager 62 generates a response message 96 for communication to client manager 46 denying authorization to record an additional data session. For example, manager 96 may instruct client manager 46 that the data session identified in message 94 should not be recorded. In this respect, session manager 62 throttles the execution of recording plans 90 by voice record manager 50 and/or client manager 46 based on network capacity and available hardware and/or software resources.

To authorize or reject a request to record a session communicated in a message 94, session manager 62 may also determine whether a session is already being recorded for that particular client. For example, if session manager 62 receives a request to record a voice session conducted by a particular client, session manager may review session table 100 to determine whether a voice session is already being recorded for the client. If so, then session manager 62 may deny authorization to record the requested voice session. Otherwise, session manager 62 may grant authorization to record the requested voice session.

Session manager 62 coordinates the operation of various components within call center 12 to synchronize the recording of voice and/or data sessions conducted by particular clients in accordance with appropriate recording plans 90. For example, if session manager 62 determines that there is available capacity within voice network 18, session manager 62 generates response message 96 that instructs voice record manager 50 to start recording the voice session conducted by the client according to recording plan 90. In the event that recording plan 90 comprises both a voice recording plan 90 and a data recording plan 90, (e.g., as a result of the detection of voice presence and data presence for a particular client), session manager 62 further generates a command message 98 for communication to data record manager 54. Command message 98 instructs data record manager 54 to interact with client manager 46 associated with the appropriate client to record a corresponding data session. In this respect, the voice session and the data session conducted substantially simultaneously by the client may be recorded.

If session manager 62 determines that there is sufficient network capacity within data network 20 to record a data session as requested by client manager 46, session manager generates a response message 96 that instructs client manager 46 to start recording the data session conducted by the client according to recording plan 90. In the event that the recording plan 90 comprises both a data recording plan 90 and a voice recording plan 90, session manager 62 further generates a command message 98 for communication to voice record manager 50. Command message 98 instructs voice record manager 50 to start recording a corresponding voice session conducted by the client. In this regard, session manager 62 synchronizes the recording of voice sessions and data sessions according to a recording plan 90.

Session manager 62 may also coordinate the termination of recording sessions. For example, the recording of a voice session and/or a data session may be stopped by voice record manager 50 and/or client manager 46, respectively, in accordance with the appropriate recording plan 90. In response, transaction information detailing various aspects of the recorded session is communicated to session manager 62. The transaction information may include a stop record notification that indicates that the recording was stopped. If the notification is associated with a voice session, in accordance with a recording plan 90 that comprises both a voice recording plan 90 and a data recording plan 90, then session manager 62 communicates to client manager 46 a command to stop recording the corresponding data session. Similarly, if the notification is associated with a data session, in accordance with a recording plan 90 that comprises both a voice recording plan 90 and a data recording plan 90, then session manager 62 communicates to voice record manager 50 a command to stop recording the corresponding voice session. In this regard, session manager 62 synchronizes the termination of voice and/or data sessions according to a recording plan 90.

Voice record manager 50 and client manager 46 communicate to session manager 62 transaction information associated with recording sessions that have been completed. The transaction information may include a client identifier, information associated with the recording plan 90 according to which the session was recorded, recording specifications (e.g., a start time of the recorded session, the end time of the recorded session, the length of the recorded session), a path identifier for the storage location of the recording, and any other suitable transaction information. The transaction information may be stored in a transaction table 200.

Session manager 62 maintains a session table 100 that tracks information and statistics associated with a number of ongoing recording sessions, referred to generally as session information. Session table 100 is described in greater detail with respect to FIG. 3. In one embodiment, session manager 62 may use session table 100 to usurp resources dedicated to a particular recording session in favor of a requested session. For example, session manager 62 may determine that there is insufficient capacity to record a requested voice and/or data session. However, session manager 62 may determine that the recording plan 90 according to which the voice and/or data session that is requested has a higher priority than that of an ongoing recording session. Session manager 62 may then terminate at least one of the plurality of ongoing recording sessions identified in session table 100 in order to make available sufficient capacity to record the requested voice and/or data session according to the recording plan 90 having a higher priority.

In another embodiment, session manager 62 may receive a "record on demand" command from client manager 46, voice record manager 50, or other components of system 10 independent of any recording plan 90. Such recording commands generally have a higher priority than recording requests that are made according to recording plans 90. Therefore, session manager 62 may terminate one of the number of ongoing recording sessions associated with recording plans 90 to make available sufficient capacity to record a voice and/or data session associated with a "record on demand" command received by session manager 62. In a particular embodiment where session manager 62 receives a "record on demand" command for recording a voice session, session manager 62 determines the particular group of voice channels to which the client may be assigned and usurps resources from an ongoing recording session that is using a voice channel in the same group. In this regard, session manager 62 usurps hardware and/or software capacity for particular types of recording sessions in favor of recording sessions having a higher priority.

In a particular embodiment where session manager 62 receives multiple recording requests/commands for the same client, session manager 62 generally authorizes one request/command and denies the other request/command. In this embodiment, session manager 62 may "link" the recording that is ultimately performed according to the authorized request/command with the request/command that is denied. For example, session manager 62 may receive a request to record a voice session according to a recording plan 90 for a particular client. Session manager 62 may also receive a "record on demand" command to record a voice session for the same client. In this instance, session manager 62 may record the voice session according to the "record on demand" command but then provide a link to the recording to the request that was denied. The recording may not fulfill the various recording goals and parameters of the recording plan 90 that was denied, but the recording may be reviewed for informational purposes.

Presentation manager 64 of platform 16 generally processes the individual recordings of voice and/or data sessions to produce one or more multimedia files that are appropriately formatted to support faithful reproduction by a multimedia player. For example, a recorded data session file may be synchronized with a corresponding recorded voice session file to generate a multimedia file. The multimedia file may be formatted as an audio video interleave (AVI) file, Moving Pictures Experts Group (MPEG) file, WAV file, or any other suitably formatted file. An application capable of playing back the recording may be REALPLAYER, WINDOWS MEDIA PLAYER, or any other suitable multimedia application.

Message server 66 of platform 16 generally creates and communicates work items associated with sessions to owners responsible for performing the work. In a particular embodiment, message server 66 updates transaction table 200 using session summaries communicated by session manager 62. The session summaries may provide details regarding various sessions performed in call center 12 (e.g., voice and/or data recording sessions, evaluation sessions, and survey sessions). Message server 66 is described in greater detail in pending U.S. application Ser. No. 10/072, 431, entitled "System and Method for Processing Work According to an Active Work Model," which is incorporated herein by reference for all purposes.

FIG. 2 illustrates one embodiment of a graphical user interface (GUI) 110 that provides an easy-to-use interactive interface for a user of system 10 to create a plan template 88. As described above, plan manager 58 uses the information from a plan template 88 in order to create a recording plan 90 for a particular client of call center 12. GUI 110 includes General Information section 112, Details section 114, Triggers section 116, Users section 118, and Notifications section 120.

General Information section 112 includes fields and indicators used to identify a particular plan template 88. For example Section 112 includes name 122, description 124, and activation indicator 126. Name 122 uniquely identifies the plan template 88. Description 124 comprises a brief description of the plan template 88. Activation indicator 126 indicates whether a corresponding recording plan 90 has been activated for a particular client.

Details section 114 includes fields used to establish various recording parameters and guidelines. For example, Section 114 includes date 130, monitoring object 132, and recording pattern 134. Date 130 comprises a date on which the particular plan template 88 may be activated to create a recording plan 90. Monitoring object 132 identifies the types of users that may be monitored using a corresponding recording plan 90. Recording pattern 134 defines a sampling of voice and/or data sessions that are recorded according to a recording plan 90.

Different types of recording patterns include a greatest dispersion recording pattern, a first available recording pattern, a manual recording pattern, and a random recording pattern. The greatest dispersion recording pattern generally seeks to record particular voice and/or data sessions conducted by a client according to a predefined distribution over the course of a plan period. The first available recording pattern generally seeks to record the first available voice and/or data sessions conducted by a client during a particular plan period. The manual recording pattern follows a predetermined distribution of recordings for the plan period. The random recording pattern seeks to record a random selection of voice and/or data sessions conducted by a client during a plan period. The sample of voice and/or data sessions recorded according to recording plan 90 is based at least in part upon the recording pattern 134.

Details section 114 further includes recording number 136, recording type 138, plan period 140, and maximum recordings 144. Recording number 136 and recording type 138 quantify the number of recordings to be made during the plan period and the type of recordings (e.g., voice sessions, data sessions, and voice and data sessions) to be made. Plan period 140 specifies the periodicity of the plan. For example, the plan period 140 may be specified for a particular number of days, weeks, months, and years. The maximum recordings 144 specifies the maximum number of recordings that may be performed for a particular client in any given day.

Details section 114 further includes start time 146 and end time 148 and triggers 150 and 152. Start time 146 and end time 148 indicate the time of day that recordings may be made for a particular client. Triggers 150 and 152 indicate whether and what type of trigger conditions will apply. Details section 114 further includes voice templates 154 and screen templates 156 that comprise recording attributes and parameters that may be used to record voice and/or data sessions. For example, these attributes may comprise voice and/or data channel characteristics upon which a trigger condition may be based. Details section 114 further includes a plan recurrence indicator 158 that identifies the number of times that a particular recording plan 90 should be repeated.

Triggers section 116 includes fields to establish various trigger conditions. For example, section 116 includes trigger types 160 and trigger identification 162. Trigger types identify the particular type of trigger that may be used to start and/or stop a recording session. Various trigger types include automatic number identification (ANI) triggers, DNIS triggers, and User Data triggers. For any given trigger type 162, the user may set an associated trigger condition. For example, the user may identify a call extension for an ANI trigger type.

Users section 118 identifies the participants of call center 12 to whom a recording plan 90 may apply. For example, section 118 includes owner 164, available groups and users 166, and assigned users 168. Owner 164 identifies a participant of call center 12 to whom a particular recording plan 90 is assigned. The owner 164 to which a recording plan 90 is assigned is generally responsible for any work items that need to be performed with regard to voice and/or data sessions recorded according to the recording plan 90. For example, a particular owner 164 may be responsible for reviewing and/or evaluating voice and/or data sessions recorded according to a recording plan 90. Available groups and users 166 comprise those agents, supervisors, or other participants in call center 12 to which a particular recording plan 90 may be applied. Assigned users 168 identifies those participants to which a corresponding recording plan 90 will be applied.

Notifications section 120 includes notifications 170 and addresses 172. Notifications 170 specify those participants of call center 12 that will receive an e-mail notification that a corresponding recording plan 90 has been fulfilled. Addresses 172 comprise, for example, e-mail addresses for those participants specified by notifications 170.

FIG. 3 illustrates one embodiment of a session table 100 used in system 10. Each entry in session table 100 corresponds to a session identifier 202 and corresponds to an ongoing voice session and/or data session as indicated by recording type 204. Each voice session and/or data session is associated with a recording plan 90 according to which the recording is performed. The recording plan 90 is indicated using recording plan identifier 206. For those recordings that are performed in response to a "record on demand" command, recording plan identifier 206 may indicate "ROD". Each voice session and/or data session may be assigned a particular priority 208. Priority 208 allows session manager 62 to usurp hardware and/or software resources as described above.

Each entry in session table 100 includes a resources identifier 210 that identifies the hardware and/or software resources being used by system 10 to perform the corresponding recording. For example, resources identifier 210 may indicate the particular voice channels used to record a voice session. In another example, resources identifier 210 may indicate the data network resources and/or bandwidth being utilized to record a data session. Each entry in session table 100 also includes a client identifier 212 that identifies the client conducting the voice and/or data session being recorded. In one embodiment, client identifier 212 may identify an IP address, voice instrument extension, name, or any other suitable indicator of a client in call center 12.

FIG. 4 illustrates one embodiment of a transaction table 220 used in system 10. Each entry in transaction table 220 corresponds to a completed recording in call center 12. For example, each entry may refer to a recorded voice session and/or data session conducted by a client in call center 12. Each entry in transaction table 220 corresponds to a client identifier 230 that identifies the client that conducted the voice and/or data session that was recorded. Each entry further corresponds to a recording plan identifier 232 indicating the recording plan 90 according to which the voice and/or data session was performed. The recording plan identifier 232 may be used to identify the particular recording parameters used to perform the recording. Each entry of transaction table 220 further corresponds to recording specifications 234 that may indicate, for example, the length of the recording, the start time of the recording, the end time of the recording, and particular CTI events that occurred during the recording.

Each entry further corresponds to path identifier 236 that identifies the storage location from which components of communication system 10 can retrieve the identified voice and/or data session. For example, path 236 may specify locations in database 70, URL addresses, file transfer protocol (FTP) addresses, addresses supported by LAN 30 or PSTN 14, file path names, or other addressing or location information to identify and retrieve voice and/or data sessions recordings in call center 12. Path identifier 236 may reflect naming conventions that identify the session, time, server or other information regarding stored voice and/or data sessions. Each entry further corresponds to trigger information 238 that identifies the trigger conditions that caused a particular voice and/or data session to be recorded. For example, trigger information 238 may comprise trigger conditions associated with events occurring on voice network 18 and/or data network 20.

Figure 5:
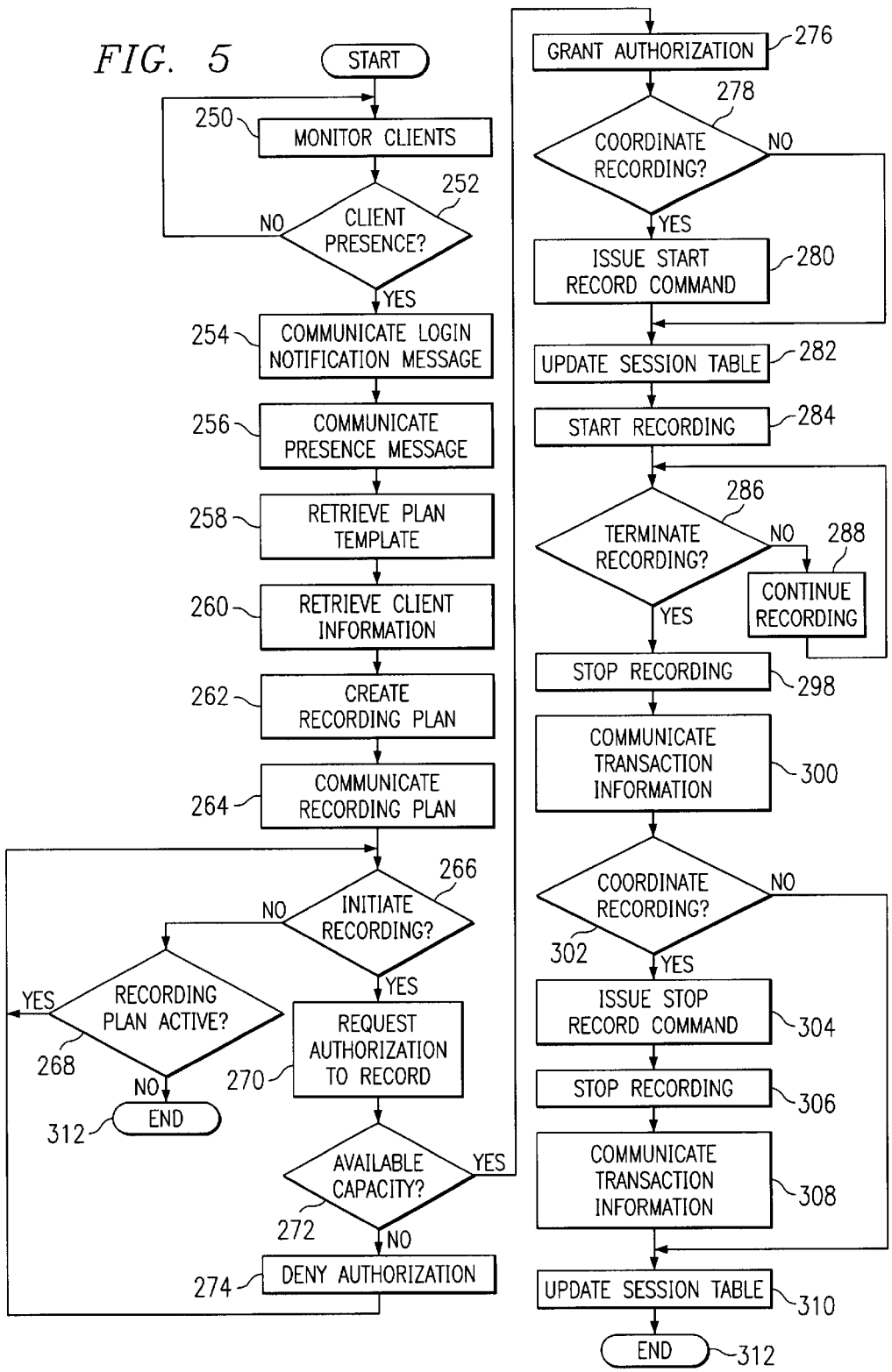
FIG. 5 is a flowchart of a method for implementing recording plans in the communication system.

FIG. 5 is a flowchart of a method for implementing recording plans 90 in system 10. The method begins at step 250 where call manager 52 and/or client manager 46 monitor the presence of clients in call center 12. At step 252, call manager 52 determines whether a client is present within voice network 18 and/or client manager 46 determines whether a client is present within data network 20. If neither call manager 52 nor client manager 46 detects client presence, execution returns to step 250. If either or both of call manager 52 and client manager 46 detect client presence within call center 12, execution proceeds to step 254 where the appropriate one or both of call manager 52 and client manager 46 communicate a login notification message 82 and/or 84 to client monitor 56. In response to receiving a login notification message 82 and/or 84, client monitor 56 generates a presence message 86 for communication to plan manager 58, at step 256. Presence message 86 indicates the type of presence detected within call center 12 and the identity of the client whose presence was detected.

In response to receiving presence message 86, plan manager 58 retrieves an appropriate plan template 88 from database 70, at step 258, based at least upon the type of presence that is detected and the identity of the particular client whose presence was detected. In a particular embodiment, plan manager 58 further retrieves client information 92 at step 260 based upon the client identity indicated in presence message 86. Execution proceeds to step 262 where plan manager 58 creates a recording plan 90 for the particular client based at least in part upon the retrieved plan template 88 and, in a particular embodiment, client information 92. Recording plan 90 may be a voice recording plan 90, a data recording plan 90, or a voice and/or data recording plan 90 based upon the type of presence detected within call center 12. Plan manager 58 communicates recording plan 90 to appropriate ones of voice record manager 50, client manager 46, and/or trigger manager 60 based upon the type of recording plan 90 that is generated, at step 264.

Once a recording plan 90 is activated for a particular client based upon detecting the presence of the client, call center 12 records voice and/or data sessions conducted by the client according to the recording plan 90. The following steps in the flowchart illustrated in FIG. 5 describe this execution of a recording plan 90. At step 266, the appropriate ones of voice record manager 50, client manager 46 and/or trigger manager 60 determine whether it is appropriate to initiate a recording of a voice and/or data session according to recording plan 90. These components may initiate recording a voice and/or data session, referred to generally as a recording session, in accordance with the recording instructions of recording plan 90 or as a result of the occurrence of a trigger condition. If a recording session is not initiated at step 266, execution proceeds to step 268 where it is determined whether recording plan 90 is still active. A recording plan 90 may deactivate as a result of the particular client failing to maintain presence within call center 12 (e.g., logging out of voice network 18 and/or data network 20), as a result of the plan period expiring, as a result of error or reset conditions, or any other appropriate event occurring to deactivate recording plan 90. If the recording plan 90 is no longer active, as determined at step 268, execution terminates at step 312. If recording plan 90 is active as determined at step 268, execution returns to step 266.

If it is appropriate to initiate recording a voice and/or data session, as determined at step 266, execution proceeds to step 270 where voice record manager 50 and/or client manager 46 communicate a request for authorization to record the voice and/or data session according to the appropriate recording plan 90. The request for authorization is communicated in a message 94 to session manager 62. Execution proceeds to step 272 where session manager 62 determines whether there is available capacity to record the requested voice and/or data session. If there is insufficient capacity, as determined at step 272, execution proceeds to step 274 where session manager 62 denies authorization to record the voice and/or data session. This denial of authorization may be communicated in a response message 96. Execution then proceeds to step 266. If it is determined that there is available capacity to record the voice and/or data session, at step 272, execution proceeds to step 276 where session manager 62 grants authorization to record the requested voice and/or data session. The granting of authorization may be communicated in response message 96.

In one embodiment, session manager 62 coordinates the operation of various components within call center 12 to synchronize the recording of voice and/or data sessions conducted by the particular client, in accordance with the recording plan 90. For example, upon granting authorization at step 276 to voice record manager 50 to record a voice session, session manager 62 determines whether to coordinate recording a corresponding data session at step 278. In the event that the recording plan 90 comprises both a voice recording plan 90 and a data recording plan 90 (e.g., as a result of the detection of voice presence and data presence for a particular client), execution proceeds to step 280 where session manager 62 issues a start record command message 98 for communication to data record manager 54. Command message 98 instructs data record manager 54 to interact with client manager 46 associated with the appropriate client to record a data session that corresponds to the voice session authorized at step 276. Upon issuing the command at step 280 or upon determining that voice and/or data recording sessions do not need to be coordinated according to the recording plan 90, at step 278, execution proceeds to step 282 where session manager 62 updates session table 100.

At step 284, the appropriate ones of voice record manager 50 and/or client manager 46 start recording a voice and/or data session conducted by the particular client whose presence was detected at step 252. It is determined by voice record manager 50 and/or client manager 46 whether to terminate the recording, at step 286. If the recording of the voice and/or data session is not to terminate, execution proceeds to step 288. The recording of the voice and/or data session is continued until it is determined at step 286 that it should be terminated. At this time, execution proceeds to step 298 where voice record manager 50 and/or client manager 46 stops recording the voice and/or data session and then communicates transaction information to session manager 62 at step 300.

Session manager 62 determines whether to again coordinate recording of voice and/or data sessions. This time, session manager 62 coordinates the termination of recording sessions according to a common recording plan 90. For example, if the transaction information communicated at step 300 indicates that the recording of a voice session has been terminated by voice record manager 50 in accordance with a recording plan 90 that comprises both a voice recording plan 90 and a data recording plan 90, then execution proceeds to step 304 where session manager 62 communicates to client manager 46 a command to stop recording the corresponding data session. Client manager 46 then stops recording the data session at step 306 and communicates transaction information to session manager 62 at step 308. Upon completing the coordination of recording at steps 304–308 or upon determining that session manager 62 should not coordinate recording at step 302, execution proceeds to step 310 where session manager 62 updates session table 100. Execution terminates at step 312.

Although the present invention has been described with several embodiments, a myriad of changes, variations, alterations, transformations, and modifications may be suggested to one skilled in the art, and it is intended that the present invention encompasses such changes, variations, alterations, transformations, and modifications as fall within the spirit and scope of the appended claims.

What is claimed is:

1. A system for implementing a recording plan, comprising:
   a first record manager operable to generate a first message that comprises a request to record a first session according to a recording plan, wherein the first session is conducted by a client associated with the recording plan;
   a second record manager; and
   a session manager communicatively coupled to the first record manager and the second record manager, the session manager operable to:
   generate a second message for communication to the first record manager, the second message comprising an authorization to record the first session; and
   generate a third message for communication to the second record manager, the third message comprising a command to record a second session.

2. The system of claim 1, wherein the first session comprises a voice session and the second session comprises a data session that is conducted by the client for at least a portion of time that is simultaneous to the voice session.

3. The system of claim 1, wherein the first session comprises a data session and the second session comprises a voice session that is conducted by the client for at least a portion of time that is simultaneous to the data session.

4. The system of claim 1, wherein the session manager is further operable to determine available capacity to record the first session, and the authorization to record the first session is based at least in part upon the available capacity.

5. The system of claim 4, wherein the first message further comprises recording type information that indicates whether the first session comprises a voice session or a data session, and the session manager is further operable to determine available capacity based at least in part upon the recording type information.

6. The system of claim 4, wherein the session manager is further operable to maintain session information associated with a plurality of ongoing sessions, wherein the authorization to record the first session is further based upon the session information.

7. The system of claim 1, wherein:
   the first record manager is further operable to stop recording the first session according to the recording plan and to generate a fourth message that comprises a stop record notification; and
   the session manager is further operable to generate a fifth message in response to the stop record notification, the fifth message for communication to the second record manager and comprising a command to stop recording the second session.

8. The system of claim 1, wherein the first record manager is further operable to stop recording the first session according to the recording plan and to generate a fourth message for communication to the session manager, the fourth message comprising transaction information associated with the first session.

9. The system of claim 1, wherein the session manager is further operable to:
   maintain session information that tracks a plurality of ongoing sessions;
   receive a fourth message that comprises a command to record a third session; and
   generate a fifth message in response to the fourth message, wherein the fifth message comprises a command to stop recording at least one of the ongoing sessions.

10. The system of claim 9, wherein at least a portion of the ongoing sessions are associated with a first recording plan having a first priority and a second recording plan having a second priority, and the command to stop recording at least one of the ongoing sessions is based at least in part upon the first priority and the second priority.

11. The system of claim 1, wherein the recording plan comprises a first recording plan associated with a first priority and the session manager is further operable to:
   receive a fourth message that comprises a request to record a third session according to a second recording plan associated with a second priority; and
   generate a fifth message in response to the fourth message, the fifth message comprising a command to stop recording the first session, wherein the command is based at least in part upon the first priority and the second priority.

12. A system for implementing a recording plan, comprising:

a record manager operable to generate a first message that comprises a request to record a session according to a recording plan, wherein the session is conducted by a client associated with the recording plan;

a session manager communicatively coupled to the record manager and operable to:
receive the first message;
determine available capacity to record the session; and
generate a second message that comprises a response to the first message, wherein the response is based at least in part upon the available capacity.

13. The system of claim 12, wherein the first message further comprises recording type information that indicates whether the session comprises a voice session or a data session, and the session manager is further operable to determine available capacity based at least in part upon the recording type information.

14. The system of claim 12, wherein the session comprises a voice session, the response to the first message comprises an authorization to record the voice session, and the session manager is further operable to generate a third message that comprises a command to record a data session associated with the recording plan.

15. The system of claim 14, wherein the data session is conducted by the client for at least a portion of time that is simultaneous to the voice session.

16. The system of claim 12, wherein the session comprises a data session, the response to the first message comprises an authorization to record the data session, and the session manager is further operable to generate a third message that comprises a command to record a voice session associated with the recording plan.

17. The system of claim 16, wherein the voice session is conducted by the client for at least a portion of time that is simultaneous to the data session.

18. The system of claim 12, wherein the session manager is further operable to maintain session information that tracks a plurality of ongoing sessions, wherein the response is further based upon the session information.

19. The system of claim 12, wherein the session manager is further operable to:
maintain session information that tracks a plurality of ongoing sessions;
receive a third message that comprises a command to record a new session; and
generate a fourth message in response to the third message, wherein the fourth message is communicated to the record manager and comprises a command to stop recording at least one of the ongoing sessions.

20. The system of claim 19, wherein the ongoing sessions comprise a first session associated with a first recording plan having a first priority and a second session associated with a second recording plan having a second priority; and the fourth message comprises a command to stop recording at least one of the first session and the second session based at least in part upon the first priority and the second priority.

21. The system of claim 12, wherein the response comprises an authorization to record the session, and the record manager is further operable to stop recording the session according to the recording plan and to generate a third message for communication to the session manager, the third message comprising transaction information associated with the session.

22. A system for recording sessions, comprising:
a record manager operable to record a plurality of ongoing sessions; and
a session manager communicatively coupled to the record manager and operable to:
receive a first message that comprises a command to record a new session; and
generate a second message for communication to the record manager, the second message comprising a command to stop recording at least one of the ongoing sessions.

23. The system of claim 22, wherein:
the ongoing sessions comprise a first session associated with a first recording plan having a first priority and a second session associated with a second recording plan having a second priority; and
the second message comprises a command to stop recording at least one of the first session and the second session based at least in part upon the first priority and the second priority.

24. The system of claim 22, wherein at least one of the ongoing sessions is recorded according to a first recording plan having a first priority, and the session manager is further operable to:
receive a third message that comprises a request to record a new session according to a second recording plan associated with a second priority; and
generate a fourth message in response to the third message, the fourth message comprising a command to stop recording at least one of the ongoing sessions recorded according to the first recording plan, wherein the command is based at least in part upon the first priority and the second priority.

* * * * *